United States Patent

Boetto et al.

[15] 3,653,449
[45] Apr. 4, 1972

[54] ROTARY CULTIVATOR WHEEL

[72] Inventors: Charles Boetto, Naperville; John F. Stufflebeam, Lockport; Noel G. Artman, Chicago, all of Ill.

[73] Assignee: International Harvester Company, Chicago, Ill.

[22] Filed: Oct. 16, 1970

[21] Appl. No.: 81,238

[52] U.S. Cl. .............................................. 172/548, 172/771
[51] Int. Cl. .................................... A01b 21/02, A01b 23/02
[58] Field of Search ................ 172/548, 540, 542, 549, 555, 172/556, 559, 713, 766, 771, 532, 118, 122, 123, 177, 165

[56] References Cited

UNITED STATES PATENTS

| 1,456,860 | 5/1923 | Turner | 172/556 |
| 3,087,557 | 4/1963 | Hohstadt | 172/556 |
| 3,107,737 | 10/1963 | Van Sickle et al. | 172/548 |
| 3,232,350 | 2/1966 | Whitesides | 172/548 |
| 3,397,748 | 8/1968 | Whitesides | 172/548 |

*Primary Examiner*—Robert E. Pulfrey
*Assistant Examiner*—Stephen C. Pellegrino
*Attorney*—Floyd B. Harman

[57] ABSTRACT

A rotary hoe wheel is adapted to be propelled at an angle to the direction of travel and is provided with teeth extending radially from a hub and curved rearwardly with the surface of the ground being first engaged by a curved portion of each tooth between the hub and the outer end thereof. A cross-section of the tooth is disposed in a tilted plane to provide an earth penetrating leading edge and each tooth has a lower convex surface and an upper concave surface forming a scoop to lift and turn the soil.

8 Claims, 6 Drawing Figures

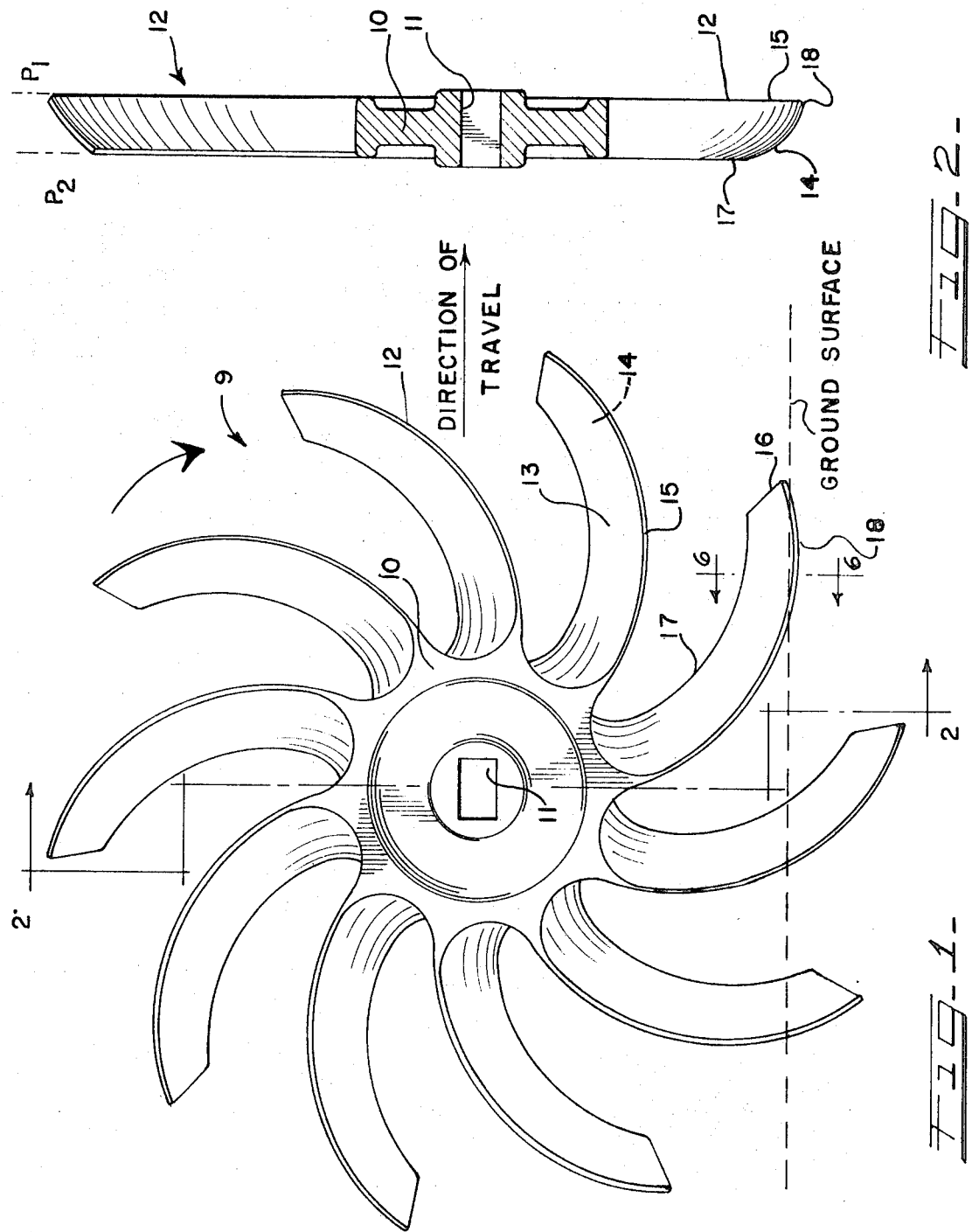

Patented April 4, 1972
3,653,449
3 Sheets-Sheet 3
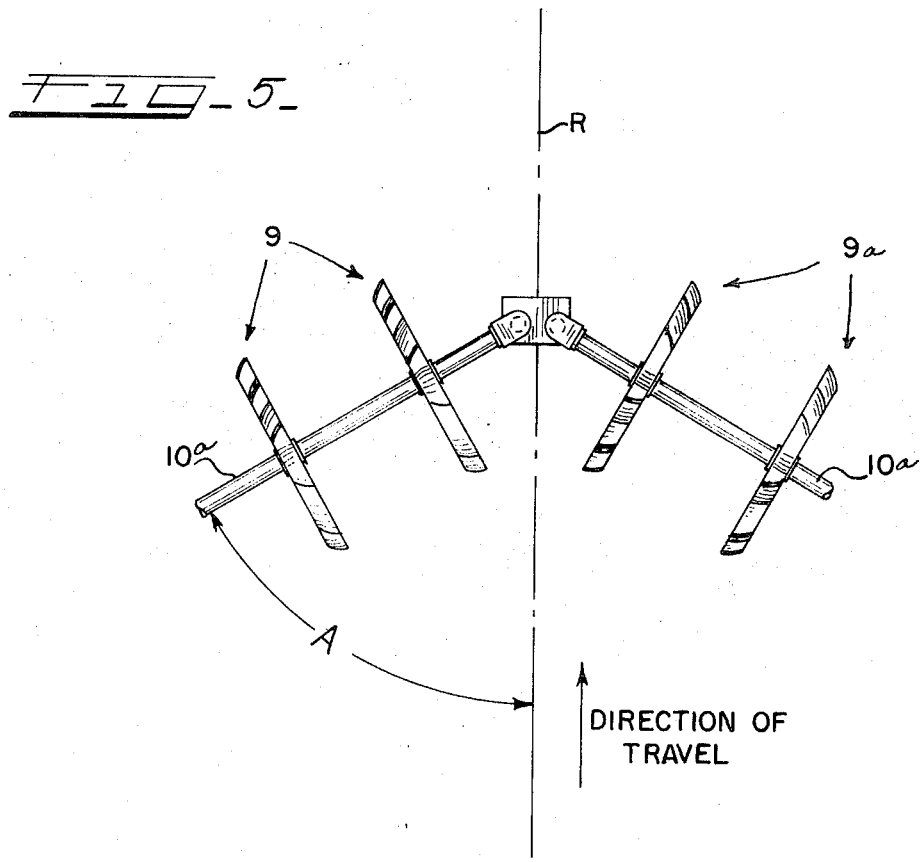
FIG_5_
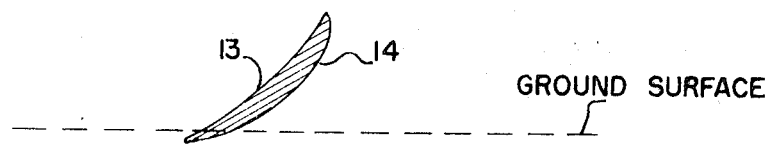
FIG_6_
INVENTORS
CHARLES BOETTO
JOHN F. STUFFLEBEAM
NOEL G. ARTMAN
BY
ATT'Y.

ROTARY CULTIVATOR WHEEL

BACKGROUND OF THE INVENTION

This invention relates to agriculture implements and particularly to a toothed cultivator wheel of the rotary hoe type.

Rotary hoes usually comprise a series of closely spaced toothed wheels designed to pulverize the upper levels of soil and disposed in planes either parallel to or at an angle to the direction of travel. When arranged parallel to the direction of travel the necessary spacing between adjacent wheels leaves portions of the soil relatively untilled so that the wheels are frequently angled in order that the action of adjacent wheels overlaps and all of the soil is tilled.

The action of a moldboard plow bottom, the purposes of which is to penetrate rather deeply into the ground and turn a large furrow slice, is well known. The shape of such a plow bottom and its angle of penetration when lowered to the ground to begin a plowing operation are such that the propelling power of the tractor causes the plow bottom to be drawn into the ground and the plow bottom seeks its own operating depth according to the line of draft from the tractor. The wheels of known rotary hoe implements are not so aggressive as the moldboard plow and do not penetrate the ground sufficiently to break up and move the soil. In order to force the teeth of rotary hoe wheels into the ground it has frequently been necessary to build great weight into the implement or to provide of such means for exercising downward pressure on the wheels. Another failing of such implements has been the high tractive effort required to propel the rotary wheels through the ground.

An important object of the present invention, therefore, is the provision of an improved rotary hoe wheel which is adapted to be propelled over the ground at an angle to the direction of travel and with a minimum of tractive effort.

Another object of the invention is the provision of a toothed cultivator wheel of improved construction wherein the shape and angle of the teeth causes them to penetrate the surface and to be drawn into the soil.

Another object of the invention is to provide a rotary hoe wheel having teeth of novel scoop-like construction adapted to slice through the ground an to scoop up and fracture the soil as well as to throw it laterally.

DESCRIPTION OF THE DRAWINGS

FIG. 1 is a side elevational view of the rotary hoe wheel of this invention;

FIG. 2 is a section taken on the line 2—2 of FIG. 1;

FIG. 5 is a diagrammatic plan view illustrating the angular disposition of rotary cultivator wheel gangs with respect to a crop row; and FIG. 6 is a sectional view taken at line 6—6 in FIG. 1.

DESCRIPTION OF THE PREFERRED EMBODIMENT

Figure 3:
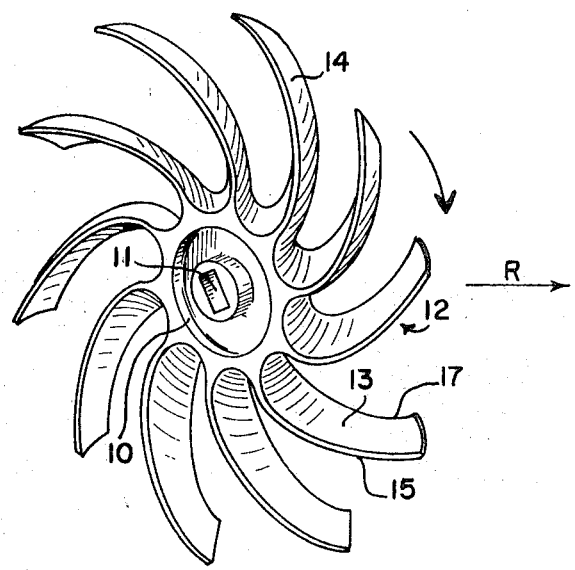
FIG. 3 is a perspective view on a smaller scale of the wheel of FIG. 1.

The rotary hoe wheel 9 shown in the drawings comprises a hub portion 10 having a rectangular axial opening 11 for mounting on a shaft 10a, FIG. 5 and it may be understood that a number of such wheels are customarily mounted on a common shaft and supported on a traveling frame, not shown, in a manner well-known in the art.

The wheel 9 is a unitary casting with identical fingers 12 radiating from the hub at circumferentially spaced locations. The fingers are arcuately shaped lengthwise thereof and are curved oppositely to the direction of rotation of the wheel, as indicated by the arrows in FIGS. 1 and 3.

Figure 4:
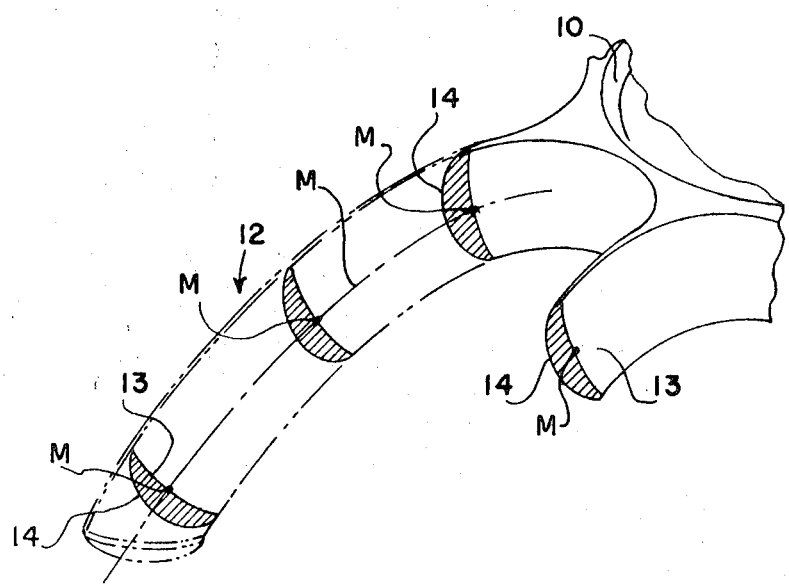
FIG. 4 is an enlarged sectional detail of a portion of the toothed wheel of this invention in which cross-sections of one of the teeth are indicated at spaced locations lengthwise thereof, showing the scoop-like configuration of its upper surface.

The fingers 12 are of substantially the same width throughout their length from their outer ends to their base ends at their juncture with the hub 10, and, with reference to the fingers as they approach the ground surface during their forward travel, and, as indicated by the cross-sectional views in FIG. 4, the trailing surface 13 of each finger is transversely concave and the leading surface 14 is convex to provide a crescent configuration. The concave trailing surface 13 is progressively twisted about a median line m coextensive with such surface lengthwise of the finger. The surface 13 of each finger is directed downwardly and at an angle to the direction of travel when in its lowermost working position within the soil.

The leading edge 15 and the trailing edge 17 of each finger 12, respectively in axially spaced planes $p^1$ and $p^2$, are sharpened and the curved leading edge 15 first engages the ground at a portion 18 thereof radially inwardly of the outer or distal end 16 and slices easily into the soil with a rearward sweeping motion facilitated by the smooth convex lower surface 14. Part of the soil spills past the leading edge 15 and onto the concave surface 13 of each finger as it slices downwardly and rearwardly into the soil, and this soil is centrifugally discharged from the concave surface as the finger rises from the nadir of its orbital movement about the wheel axis.

In operation a plurality of wheels are mounted side by side on a shaft to form a gang with the axis thereof disposed at an angle A to the direction of travel; see FIG. 5. The soil is tilled by each of the wheels being overlapped by the soil thrown by adjacent wheels to provide a through tilling of the soil over the entire width of the gang. Disposing the axis of the wheels at an angle to the direction of travel, enables the concave surfaces 13 of the fingers to deflect the soil thereon axially of the wheel in addition to the rearward centrifugal discharge of such soil.

In practice separate gangs may be mounted on opposite sides of a growing crop row and relatively angled to throw dirt toward the crop, destroying weeds in the tilled area and covering weeds in the crop row around the growing plants. The wheels 9 of one gang are angularly disposed in one direction with respect to the crop row R, as in FIGS. 3 and 5 and may be said to be a right-hand wheel and the gang of such wheels will throw pulverized dirt to the right of the direction of travel toward the crop row. As illustrated in FIGS. 1 and 6, the plane of each finger portion starting to enter the soil is tilted downwardly and inwardly in one direction toward the crop row, and will enter the soil while the concave surface 13 thereof is at an acute angle to the soil surface. The wheels 9a of the gang on the opposite side of the row R, FIG. 5, will be allochiral with respect to those of the one gang and the planes of the fingers as they penetrate downwardly into the soil will be tilted oppositely toward the crop row.

It is believed that the construction and operation of the novel rotary hoe wheel of this invention will be clearly understood from the foregoing description.

What is claimed is;

1. A soil cultivator wheel rotatable about a principal axis thereof and adapted to be propelled while disposed at an angle to the direction of travel and while part of the wheel below such axis is disposed below the soil surface, said wheel comprising a hub having circumferentially spaced soil engaging fingers extending generally radially therefrom and curved to extend oppositely to the direction of rotation of the wheel, each of said fingers being generally crescent in cross-section with a convex surface disposed in a downwardly facing attitude while below and moving downwardly relatively to the axis of such wheel to facilitate entry of the finger into and through the soil, and with an oppositely facing concave surface forming with the convex surface an earth penetrating leading edge adapted to slice and displace a portion of the soil upwardly over and onto said concave surface during forward and rotative movement of the wheel.

2. The invention set forth in claim 1, wherein said concave and convex surfaces of each finger are disposed to decline toward said leading edge of such finger and partially axially of the wheel while each such finger is below and moving downwardly relatively to the wheel axis, whereby said leading edge enters the soil surface at an acute angle thereto.

3. The invention set forth in claim 2, wherein each finger has a trailing edge to which the concave and convex surfaces span transversely from said leading edge, and wherein said leading and trailing edges are relatively sharp.

4. The invention set forth in claim 3, wherein cross-sections of said fingers taken throughout their length are substantially congruent.

5. A soil cultivator wheel having a principal axis about which it is rotatable, said wheel including a hub and fingers radiating from the hub, said fingers being curved in the same direction circumferentially of the hub and each finger being crescent shape in cross-section to provide thereon a convex leading surface and a concave trailing surface, and the fingers being orientated with respect to respective median lines extending lengthwise thereof along the concave surface thereof to dispose said concave surfaces to face partially axially of the wheel in the same axial direction.

6. A soil cultivator wheel having a principal axis about which it is rotatable, said wheel including a hub and fingers radiating from the hub, said fingers being curved in the same direction circumferentially of the hub retrogradely to the direction of operational rotation of the wheel and each finger having a convex leading surface extending longitudinally thereof from the distal end of the finger into contiguity with the hub, each of said fingers having a leading edge and a trailing edge forming opposite longitudinal borders of said convex surface, each of said fingers also having a trailing surface disposed oppositely thereon from the concave surface in spanning relation between said leading and trailing edges and extending longitudinally from the distal end of the finger into contiguity with the hub, the finger leading edges being substantially in a first plane perpendicular to the wheel axis and the finger trailing edges being substantially in a second plane spaced from the first plane and also perpendicular to said axis, and the leading edge of each finger being disposed circumferentially of the wheel in advance of the trailing edge thereof with reference to the direction of operational rotation of the wheel to dispose the finger trailing surfaces in an attitude sloping axially of the wheel in the same axial direction.

7. The invention set forth in claim 6, wherein the finger trailing surfaces are concave transversely of their respective fingers as well as longitudinally of such fingers.

8. A rotary wheel soil penetrating finger having a base end, a distal end, a leading surface extending longitudinally between said ends, and an oppositely disposed trailing surface extending longitudinally between said ends, said finger being longitudinally curved to lend a longitudinally concave character to the trailing surface and a longitudinally convex character to the leading surface, the leading surface being also transversely convex and the trailing surface being transversely concave, and the finger assuming an attitude of progressive twist with reference to a median line longitudinally bisecting the trailing surface.

* * * * *